United States Patent [19]

Yanagawa

[11] Patent Number: 5,442,609

[45] Date of Patent: Aug. 15, 1995

[54] TRACKING ERROR SIGNAL CORRECTING SYSTEM WHICH ADJUSTS GAIN SUCH THAT RENDING TRACKING ERROR SIGNALS AND RECORDING TRUCKING ERROR SIGNALS AND RECORDING TRACKING ERROR SIGNALS ARE EQUAL

[75] Inventor: Naoharu Yanagawa, Saitama, Japan

[73] Assignee: Pioneer Electronics Corporation, Tokyo, Japan

[21] Appl. No.: 88,120

[22] Filed: Jun. 22, 1993

[30] Foreign Application Priority Data

Jul. 28, 1992 [JP] Japan .................................. 4-220724

[51] Int. Cl.⁶ ............................................. G11B 7/095
[52] U.S. Cl. ............................ 369/44.280; 369/44.29; 369/44.31; 369/44.34; 369/44.35
[58] Field of Search ......................... 369/44.25–44.26, 369/44.28–44.29, 44.31, 44.34–44.36, 54

[56] References Cited

U.S. PATENT DOCUMENTS

| | | | |
|---|---|---|---|
| 4,286,318 | 8/1981 | Immink et al. | 369/44.35 X |
| 5,138,594 | 8/1992 | Fennema et al. | 369/44.29 |
| 5,197,058 | 3/1993 | Bell, Jr. et al. | 369/44.35 X |
| 5,220,549 | 6/1993 | Yanagidate | 369/44.29 |
| 5,251,194 | 10/1993 | Yoshimoto et al. | 369/44.29 X |

*Primary Examiner*—W. R. Young
*Attorney, Agent, or Firm*—Nikaido, Marmelstein, Murray & Oram

[57] ABSTRACT

A tracking error generating system is provided for generating a tracking error signal based on a laser beam irradiated on a writable optical disc by a pickup. Test data are recorded on a power calibration area (PCA) of the disc. A recording tracking error signal is obtained by jumping the pickup in the PCA, and the recording tracking error signal is stored in a first memory. A reading tracking error signal obtained through the tracking error generating system at reproduction of the optical disc is stored in a second memory. An adjusting circuit is provided for adjusting gain of the tracking error generating system so that the level of the reading tracking error signal becomes equal to the level of the recording tracking error signal.

3 Claims, 5 Drawing Sheets

TRACKING ERROR SIGNAL CORRECTING SYSTEM WHICH ADJUSTS GAIN SUCH THAT RENDING TRACKING ERROR SIGNALS AND RECORDING TRUCKING ERROR SIGNALS AND RECORDING TRACKING ERROR SIGNALS ARE EQUAL

BACKGROUND OF THE INVENTION

The present invention relates to a tracking error signal correcting system for a writable optical disc, and more particularly to a system wherein an accurate tracking error signal is always obtained, before and after information is written on the disc.

There are optical discs such as a CD including a read only CD and a writable disc which is used as a ROM. Further, as a writable optical disc having a high recording density, a write once disc and an erasable disc are provided. Information is recorded on the disc and reproduced with a laser beam. These discs are different from the CD in the material of the recording surface.

For example, the write once (CD-WO) disc has a tellurium or bismuth recording surface on which the lasers burn pits for recording. In another type of the CD-WO discs, the lasers are focused on a recording surface coated with a selenium antimony ($Sb_2Se_3$) thin film, or an oxide tellurium (TeOx) thin film, or a thin film of organic pigment, changing the reflectivity of the light.

The erasable disc uses as the recording surface, an amorphous alloy made of rare earth metals such as gallium, terbium, and others. In a magneto-optical recording method, the recording surface of the disc is initially magnetized to form a magnetic field in a direction perpendicular to the surface. The laser heats a predetermined area of the disc to elevate the temperature above Curie temperature, which is about 150° C., thereby reversing the direction of the magnetic field. To read the recorded information, the laser is irradiated on the recording surface so that polarized wave front slightly rotates as a result of the Kerr effect. Thus only the polarized wave deflected by the rotation is read by a photodetector, thereby enabling to read the information.

Referring to FIG. 5, an optical pickup for writing on and reading from these optical discs has a laser diode 1 which emits a laser beam. The laser beam is focused on the recording surface of the optical disc through a collimator lens 2, multi-prism 3, reflective mirror 4, and an objective 5. A part of the beam reflected from the optical disc passes through the multi-prism 3 and is received by a photodetector 6 so as to control the intensity of the laser beam through a feedback circuit. The other part of the reflected beam is transmitted through a convex lens 7, cylindrical lens 8, and a polarizing beam splitter 9 to a photodetector A for producing a tracking error signal, and to a photodetector B for producing a focus error signal.

In order to record information on the optical disc, an intense laser beam is emitted from the laser diode 1. In order to read information recorded on the disc, a laser beam with less intensity is needed. Hence, gains of the circuits for generating the focus error and tracking error change dependent on the intensity of the laser beam. As a result, servo systems cannot accurately operate.

FIGS. 6a and 6b show automatic gain control system for solving such a problem. Referring to FIG. 6a, the photodetector A has four detector elements A1, A2, A3 and A4. The outputs of the parallely aligned detector elements A1 and A3 are applied to a non-inverting terminal of a subtractor 10 and the output of the remaining detector elements A2 and A4 are applied to an inverting terminal of the subtractor 10 to generate an output Xa corresponding to a tracking error. Outputs of all of the detector elements A1 to A4 are applied to an adder 11 to produce an output Ya corresponding to the quantity of light of the laser beam. The outputs Xa and Ya are fed to a divider 12, where a ratio Xa/Ya is calculated to produce a tracking error signal TE.

Similarly, as shown in FIG. 6b, the photodetector B has four detector elements B1, B2, B3 and B4. The outputs of the diagonal detector elements B1 and B4 are fed to a non-inverting terminal of a subtractor 13. The outputs of the detector elements B2 and B3 are fed to an inverting terminal of the subtractor 13. Hence, the subtractor 13 produces an output Xb which corresponds to a focus error. The output of the detector elements B1 to B4 are fed to an adder 14 which generates an output Yb corresponding to the quantity of light of the laser beam. A ratio Xb/Yb is obtained at a divider 15, thereby producing a focusing error signal FE.

The ratio of the tracking error and the focusing error to the whole quantity of light at the recording is equal to the ratio at the reproducing of the recorded information. Thus, the servo systems can be accurately operated.

However, the above-described system is effective only when used for a magneto-optical discs, where the modulation rate of the tracking error signals produced by a push-pull method after a recording does not largely change from that produced before the recording. To the contrary, in a disc covered with a pigment film (CD-WO), or a phase change disc used as an erasable disc, the modulation rate changes so much that the gain of the servo system varies and hence the tracking error signal becomes unstable. That is to say, due to various shapes and depths of the pits formed at the recording, the quantity of the tracking error does not change in proportion to the quantity of light.

SUMMARY OF THE INVENTION

An object of the present invention is to provide a system for producing a tracking error signal where the gain thereof is stable, thereby enabling a track-following servo system to operate reliably.

According to the present invention, there is provided a tracking error signal correcting system for a tracking error generating system for generating a tracking error signal based on a laser beam irradiated on a writable optical disc having a predetermined recording area.

The correcting system of the invention comprises recording means for recording data on the predetermined recording area, means for obtaining a recording tracking error signal from the recorded predetermined recording area through the tracking error generating system, a first memory storing the recording tracking error signal, a second memory storing a reading tracking error signal obtained trough the tracking error generating system at reproduction of the optical disc.

Adjusting means is provided for adjusting gain of the tracking error generating system so that the level of the reading tracking error signal stored in the second memory becomes equal to the level of the recording tracking error signal stored in the first memory.

In an aspect of the invention, the recording tracking error signal is obtained by jumping a pickup one track in the predetermined recording area.

The other objects and features of this invention will become understood from the following description with reference to the accompanying drawings.

DETAILED DESCRIPTION OF THE PREFERRED EMBODIMENTS

Figure 5:
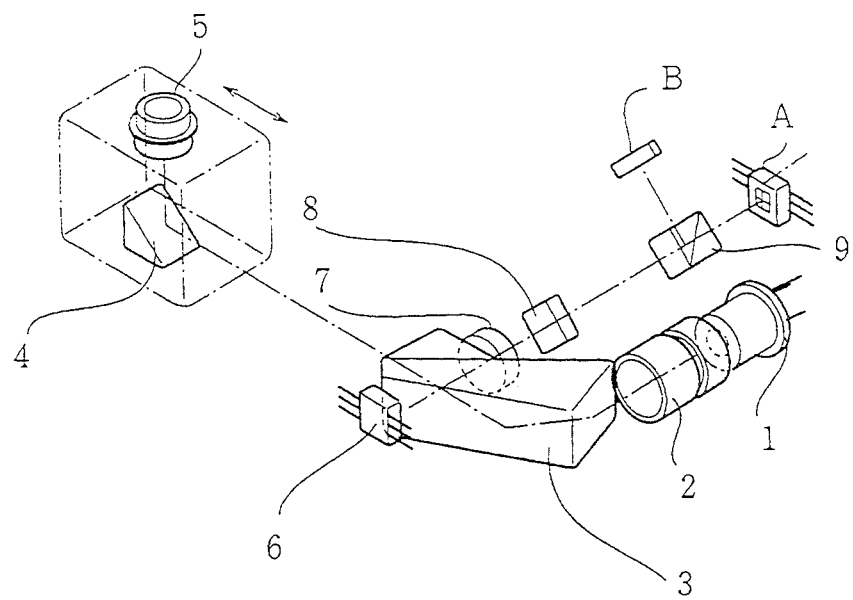
FIG. 5 is a schematic diagram showing an optical system of a pickup for recording and reproducing signals on and from an erasable optical disc.
Figure 6:
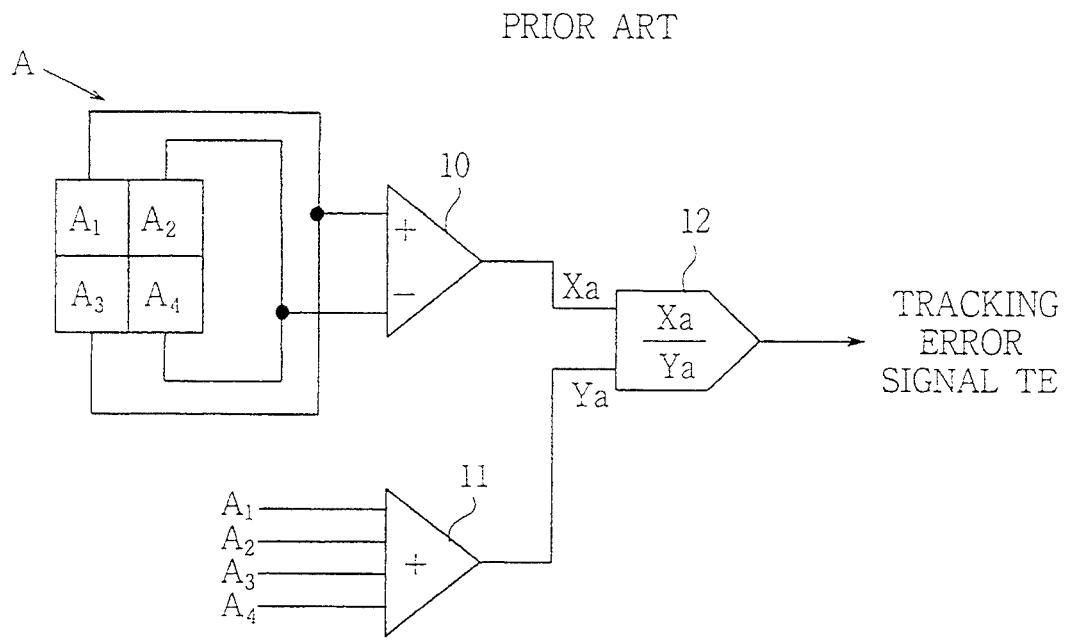
FIGS. 6a and 6b show conventional automatic gain control circuit diagrams.
Figure 6:
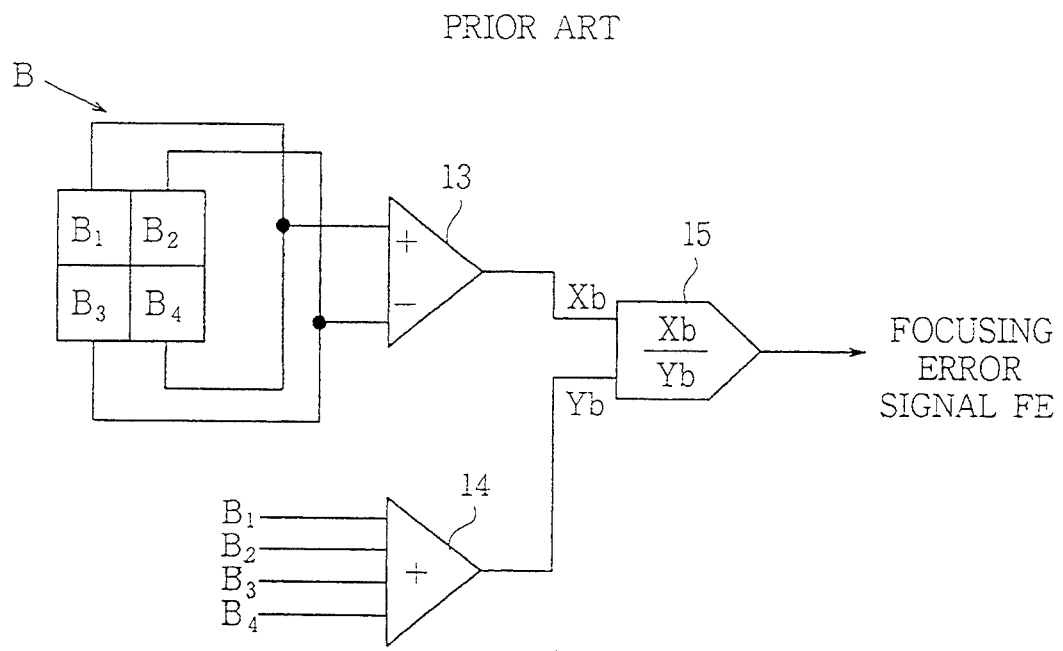

The present invention is applied to an optical pickup shown in FIG. 5, and having a tracking error generating system similar to that shown in FIG. 6a. The same numerals as those in FIG. 6a designate the same parts in FIG. 1.

Figure 1:
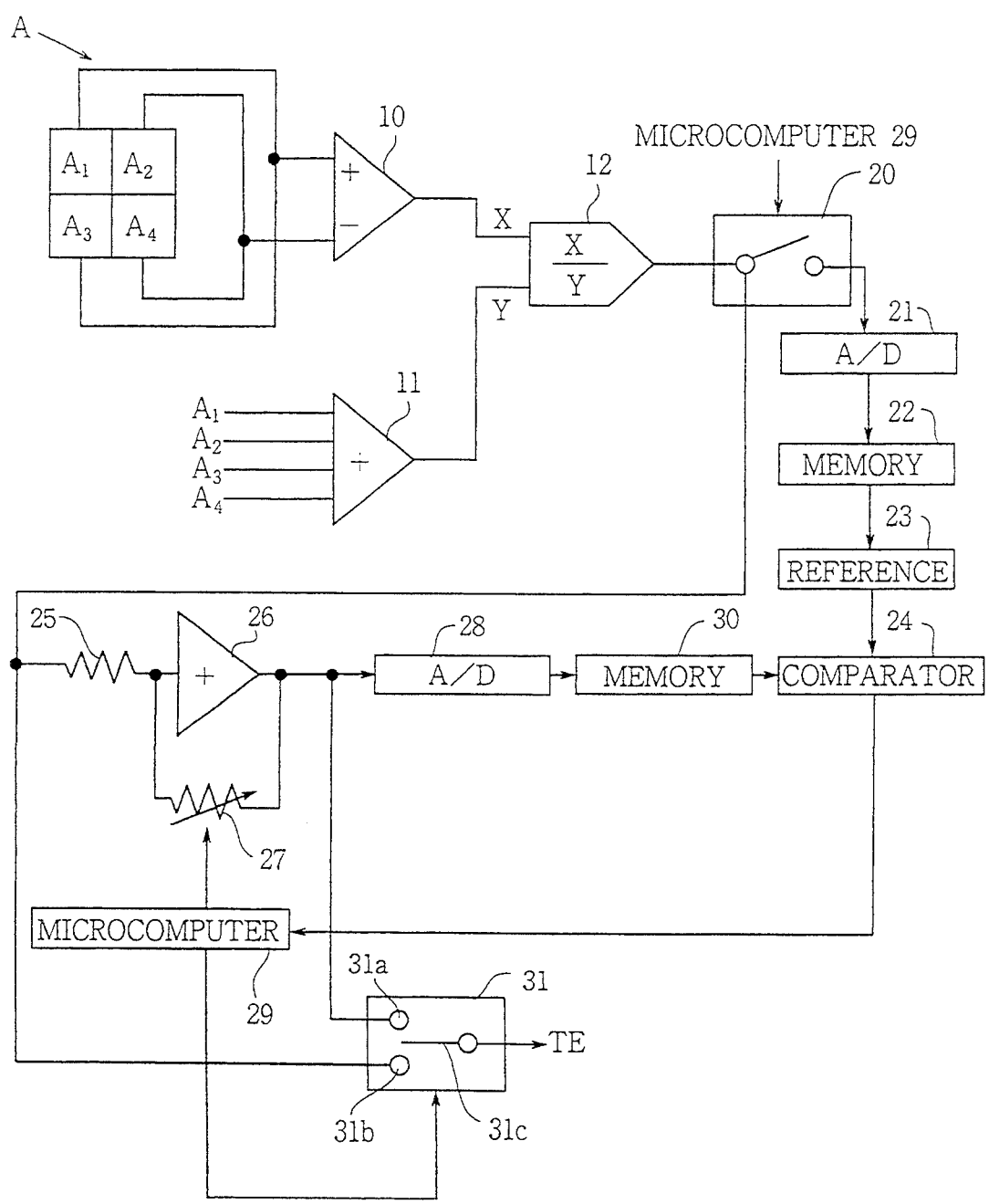
FIG. 1 is a block diagram showing a system for generating a tracking error signal.

Referring to FIG. 1, a tracking error signal generating system of the present invention is provided with the photodetector A having four detector elements A1, A2, A3 and A4, subtractor 10 for calculating a tracking error X based on the outputs of the detector elements, adder 11 for calculating a sum quantity Y of light, and the divider 12, in the same manner as the conventional circuit. The output X/Y of the divider 12 which represents a tracking error signal TE, is applied to an amplifier 26 through a resistor 25. A variable resistor 27, the resistance of which is controlled by a microcomputer 29, is disposed in parallel to the amplifier 26 between the output and the input of the amplifier, thereby to control the gain thereof. The amplifier 26 is connected to a fixed contact 31a of a changeover switch 31 which is controlled by the microcomputer 29. The changeover switch 31 has a movable contact 31c, and fixed contacts 31a and 31b. The movable contact is selectively connected with the fixed contact 31a at recording and reading a recorded information and with the fixed contact 31b at test recording before recording information. The fixed contact 31b is directly connected to the divider 12.

The amplifier 26 is further connected to an A/D converter 28 for converting the analog tracking error signal into a digital value. The digital value is stored in a memory 30.

The divider 12 is further connected to a switch 20 which is controlled by the microcomputer 29 to be turned off when recording information on the disc, and turned on when reproducing the information. When the switch is turned on, the tracking error signal X/Y is converted into a digital value by an A/D converter 21 and stored in a memory 22. The value of the tracking error signal stored in the memory 22 is retrieved and applied to a comparator 24 through a reference 23 so as to be compared with the value in the memory 30. The microcomputer 29 is applied with a signal from the comparator 24, thereby controlling the variable resistor 27.

Figure 2:
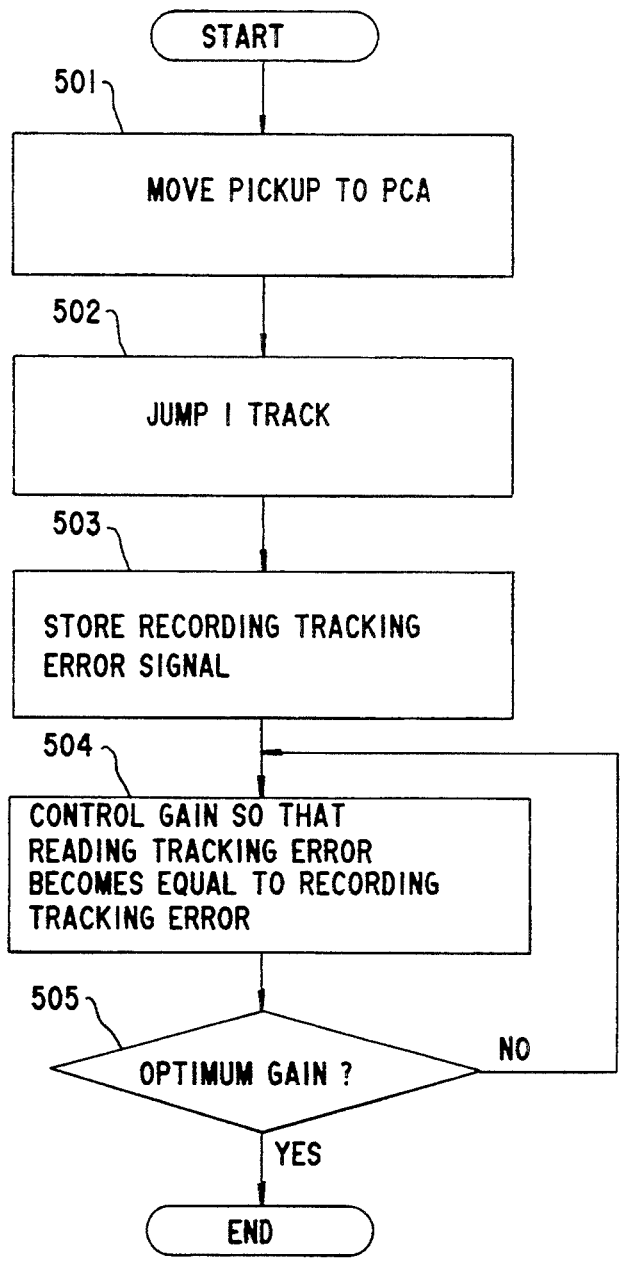
FIG. 2 is a flowchart describing the operation of the tracking error signal generating system of FIG. 1.

The operation of the present invention is described hereinafter with reference to FIG. 2.

In order to perform test recording, the microcomputer 29 is operated to turn off the changeover switch 20 and to connect the movable contact 31c of the changeover switch 31 with the fixed contact 31b.

Figure 3:
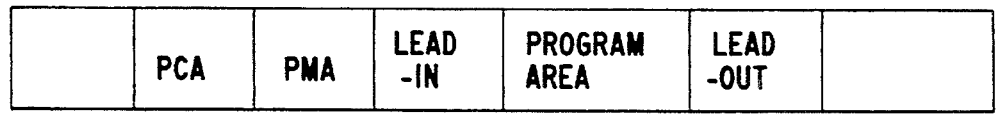
FIG. 3 is an illustration conceptually showing a part of an optical disc.

At a step 501, the optical pickup is moved to a PCA (Power Calibration Area) of the disc which is located at the innermost of the disc as shown in FIG. 3. At the step 501, the laser beam is set to an optimum recording power for recording information. Namely, the microcomputer 29 stores a plurality of data on appropriate power of the beam in accordance with various types of optical discs so that the optimum power can be derived if the type of optical disc is determined. Alternatively, various test data are recorded and reproduced until an optimum recording power is obtained.

At a step 502, the pickup is operated to jump one track in the PCA, thereby producing an intentional recording tracking error signal dependent on the recorded test signals. The amplitude of the intentional recording tracking error signal is stored in the memory 30 at a step 503 when a recording start switch (not shown) is turned on. Under such a condition, recording information is performed at a detected optimum recording power.

When a reproducing start switch (not shown) is turned on, the changeover switch 20 is closed. When the laser beam is irradiated on the optical disc, the photodetector A receives the reflection, so that the divider 12 produces a reading tracking error signal. The amplitude reading tracking error signal is stored in the memory 22.

The comparator 24 compares the amplitude of the reading tracking error signal with the amplitude of the intentional recording tracking error signal stored in the memory 30. When the two values differ from each other, the microcomputer 29 determines a desired gain of the amplifier 26, until the amplitude of the reading tracking error stored in memory 22 coincides with the level of the recording error stored in memory 30. Namely the resistance of the variable resistor 27 is set at a value corresponding to the determined gain by the microcomputer 29 (step 504). The resistor 27 is controlled until it is determined at a step 505 that the amplitude of the reading tracking signal becomes equal to the amplitude of the recording tracking error signal.

During reproduction, the movable contact 31c of the switch 31 is engaged with the fixed contact 31a. The track-following servo system is accordingly properly operated based on the corrected reading tracking error signal.

Figure 4:
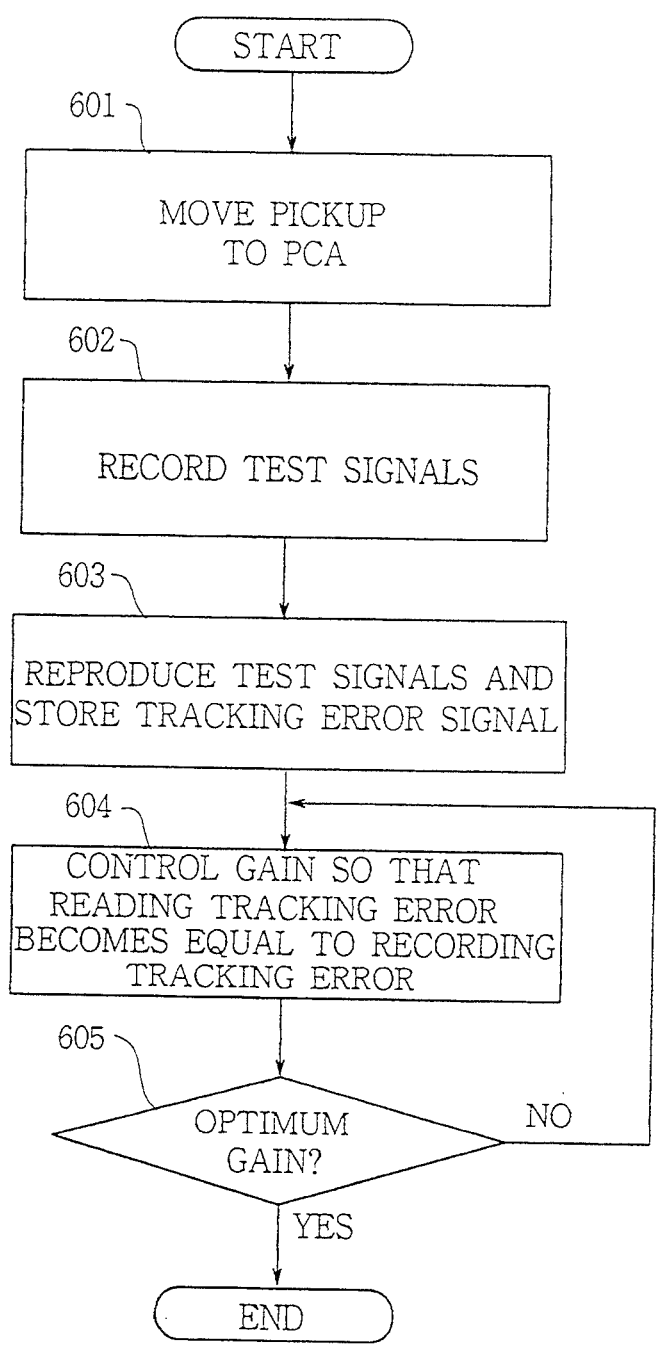
FIG. 4 is a flowchart describing an operation of the tracking error signal generating circuit in accordance with a second embodiment of the present invention.

FIG. 4 shows another embodiment of the present invention. At a step 601, the pickup is moved to the PCA. At a step 602, various test data are recorded, and an optimum recording power is determined in the same manner as in the first embodiment. After the test data are recorded, the recorded test data is reproduced. A recording tracking error signal is obtained at the reproduction of the test data. The recording tracking error signal is stored in the memory 30 (step 603). At a step 604, the gain of the amplifier 26 is controlled so that the level of a reading tracking error signal stored in the memory 22 may coincide with the level of the recording tracking error in a similar manner to the first embodiment.

From the foregoing, it will be understood that the present invention provides a tracking error generating circuit for reproducing an erasable optical disc, where an accurate tracking error signal is obtained despite of the change in modulation rate of the tracking error signal after information is written on the optical disc.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A tracking error signal correcting system for a tracking error generating system for generating a tracking error signal based on a laser beam irradiated on a writable optical disc, by a pickup, the optical disc having a predetermined recording area, the correcting system comprising:

recording means for recording data on the predetermined recording area;

means for obtaining a recording tracking error signal from the recorded predetermined recording area through the tracking error generating system;

a first memory storing the recording tracking error signal;

a second memory storing a reading tracking error signal obtained through the tracking error generating system at reproduction of the optical disc;

adjusting means for adjusting gain of the tracking error generating system so that the level of the reading tracking error signal stored in the second memory becomes equal to the level of the recording tracking error signal stored in the first memory.

2. The system according to claim 1 wherein
    the recording tracking error signal is obtained by means for jumping the pickup one track in the predetermined recording area.

3. The system according to claim 1 wherein
    the recording tracking error signal is obtained by means for reproducing the data recorded on the predetermined recording area.

* * * * *

UNITED STATES PATENT AND TRADEMARK OFFICE
CERTIFICATE OF CORRECTION

PATENT NO. : 5,442,609
DATED : August 15, 1995
INVENTOR(S) : YANAGAWA

It is certified that error appears in the above-identified patent and that said Letters Patent is hereby corrected as shown below:

Title page, [54] line 3, change "RENDING" to -- READING --.

Signed and Sealed this

Thirtieth Day of January, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,442,609
DATED : August 15, 1995
INVENTOR(S) : YANAGAWA

It is certified that error appears in the above-indentified patent and that said Letters Patent is hereby corrected as shown below:

Title page item, [73] line 1, delete "Electronics" and insert --Electronic--.

Signed and Sealed this

Twenty-fifth Day of June, 1996

Attest:

BRUCE LEHMAN

*Attesting Officer*   *Commissioner of Patents and Trademarks*